US009229781B2

(12) United States Patent
Karaoguz et al.

(10) Patent No.: US 9,229,781 B2
(45) Date of Patent: Jan. 5, 2016

(54) SYSTEM AND METHOD FOR ALLOCATING SPARE SYSTEM RESOURCES

(75) Inventors: Jeyhan Karaoguz, Irvine, CA (US); Arya Behzad, Poway, CA (US); Mark Buer, Gilbert, AZ (US); Alexander G. MacInnis, Ann Arbor, MI (US); Thomas Quigley, Franklin, NC (US); John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 1466 days.

(21) Appl. No.: 12/119,096

(22) Filed: May 12, 2008

(65) Prior Publication Data

US 2008/0313642 A1 Dec. 18, 2008

Related U.S. Application Data

(60) Provisional application No. 60/943,488, filed on Jun. 12, 2007.

(51) Int. Cl.
*G06F 9/46* (2006.01)
*G06F 9/50* (2006.01)
*G06Q 30/08* (2012.01)
*G06Q 30/06* (2012.01)
*G06Q 10/06* (2012.01)
*G06Q 30/02* (2012.01)

(52) U.S. Cl.
CPC ............... *G06F 9/5072* (2013.01); *G06F 9/50* (2013.01); *G06F 9/5011* (2013.01); *G06F 9/5027* (2013.01); *G06Q 10/06* (2013.01); *G06Q 30/06* (2013.01); *G06Q 30/08* (2013.01); *G06F 9/5005* (2013.01); *G06Q 30/0275* (2013.01)

(58) Field of Classification Search
None
See application file for complete search history.

(56) References Cited

U.S. PATENT DOCUMENTS

| 5,640,569 | A  | * | 6/1997  | Miller et al. ................ 710/241 |
| 6,968,323 | B1 | * | 11/2005 | Bansal et al. ................ 705/80 |
| 7,421,402 | B2 | * | 9/2008  | Chang et al. ................ 705/26.3 |
| 7,640,547 | B2 | * | 12/2009 | Neiman et al. ............... 718/104 |
| 7,702,799 | B2 | * | 4/2010  | Belgaied et al. ............. 709/227 |
| 7,769,639 | B2 | * | 8/2010  | Delenda ........... G06Q 10/06315 370/230 |
| 7,788,133 | B2 | * | 8/2010  | Delenda ...................... 705/26.1 |

(Continued)

OTHER PUBLICATIONS

Das et al., Combinatorial Auction-Based Protocols for Resource Allocation in Grids, 2005, Proceedings of the 19th IEEE International Parallel and Distributed Processing Symposium, (Das_2005.pdf, pp. 1-8).*

(Continued)

*Primary Examiner* — Hiren Patel
(74) *Attorney, Agent, or Firm* — Oblon, McClelland, Maier & Neustadt, L.L.P.

(57) ABSTRACT

A system and method for allocating and/or utilizing spare computing system (e.g., personal computing system) resources. Various aspects of the present invention may, for example and without limitation, provide a system and/or method that communicates incentive information with computing systems, and/or representatives thereof, regarding the allocation of computing resources for utilization by other computing systems and/or incentives that may be associated with such utilization. Various aspects of the present invention may, for example, allocate one or more resources of a computing system for utilization by another computing system based, at least in part, on such communicated incentive information.

31 Claims, 4 Drawing Sheets

(56) References Cited

U.S. PATENT DOCUMENTS

| | | | |
|---|---|---|---|
| 8,041,599 B2 * | 10/2011 | Boss et al. | 705/7.12 |
| 8,141,143 B2 * | 3/2012 | Lee | 726/12 |
| 8,635,349 B2 * | 1/2014 | Vul | G06Q 9/5005 705/37 |
| 8,719,141 B1 * | 5/2014 | Lee | G06Q 30/0275 705/14.71 |
| 2002/0095367 A1 * | 7/2002 | Mizunuma et al. | 705/37 |
| 2002/0165819 A1 * | 11/2002 | McKnight et al. | 705/39 |
| 2003/0051021 A1 * | 3/2003 | Hirschfeld et al. | 709/223 |
| 2003/0065611 A1 * | 4/2003 | Li et al. | 705/37 |
| 2003/0069828 A1 * | 4/2003 | Blazey et al. | 705/37 |
| 2003/0217287 A1 * | 11/2003 | Kruglenko | 713/200 |
| 2004/0010592 A1 * | 1/2004 | Carver | H04L 12/5695 709/226 |
| 2005/0064846 A1 * | 3/2005 | Karaoguz et al. | 455/411 |
| 2005/0262509 A1 * | 11/2005 | Kelly | 718/104 |
| 2006/0069621 A1 * | 3/2006 | Chang et al. | 705/26 |
| 2006/0152756 A1 * | 7/2006 | Fellenstein et al. | 358/1.15 |
| 2006/0155633 A1 * | 7/2006 | Fellenstein et al. | 705/37 |
| 2006/0167703 A1 * | 7/2006 | Yakov | 705/1 |
| 2006/0183462 A1 * | 8/2006 | Kolehmainen | 455/411 |
| 2007/0055554 A1 * | 3/2007 | Sussman | G06Q 10/02 705/5 |
| 2007/0073610 A1 * | 3/2007 | Marugabandhu | G06Q 40/04 705/37 |
| 2007/0260518 A1 * | 11/2007 | Ronen | G06Q 30/0224 705/14.25 |
| 2007/0297328 A1 * | 12/2007 | Semret et al. | 370/230 |
| 2008/0065525 A1 * | 3/2008 | Roeder et al. | 705/37 |
| 2008/0082425 A1 * | 4/2008 | Payton | G06Q 30/06 705/26.8 |
| 2008/0155551 A1 * | 6/2008 | Yoshida et al. | 718/104 |
| 2008/0214200 A1 * | 9/2008 | Grandblaise et al. | 455/452.2 |
| 2008/0244607 A1 * | 10/2008 | Rysin et al. | 718/104 |
| 2008/0301030 A1 * | 12/2008 | Boss | G06Q 10/06 705/37 |
| 2008/0301688 A1 * | 12/2008 | Boss et al. | 718/104 |
| 2008/0313089 A1 * | 12/2008 | Du Preez | 705/80 |

OTHER PUBLICATIONS

Seagate Technology LLC, Seagate D.A.V.E. (Digital Audio Video Experience) Transform the consumer digital content experience with the Seagate D.A.V.E. design concept, Data Sheet, 2007.

Seagate Technology LLC, Seagate D.A.V.E. (Digital Audio Video Experience) The portable storage platform that collects, plays and manages digital content, Product Overview, 2007.

* cited by examiner

SYSTEM AND METHOD FOR ALLOCATING SPARE SYSTEM RESOURCES

CROSS-REFERENCE TO RELATED APPLICATIONS/INCORPORATION BY REFERENCE

This patent application is related to and claims priority from provisional patent application Ser. No. 60/943,488 filed Jun. 12, 2007, and titled "SYSTEM AND METHOD FOR ALLOCATING SPARE SYSTEM RESOURCES," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Personal computing systems comprise any of a variety of resources, which are often utilized inefficiently. For example, such resources are generally purchased and then not utilized to their full potential.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for allocating and/or utilizing spare computing system (e.g., personal computing system) resources, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
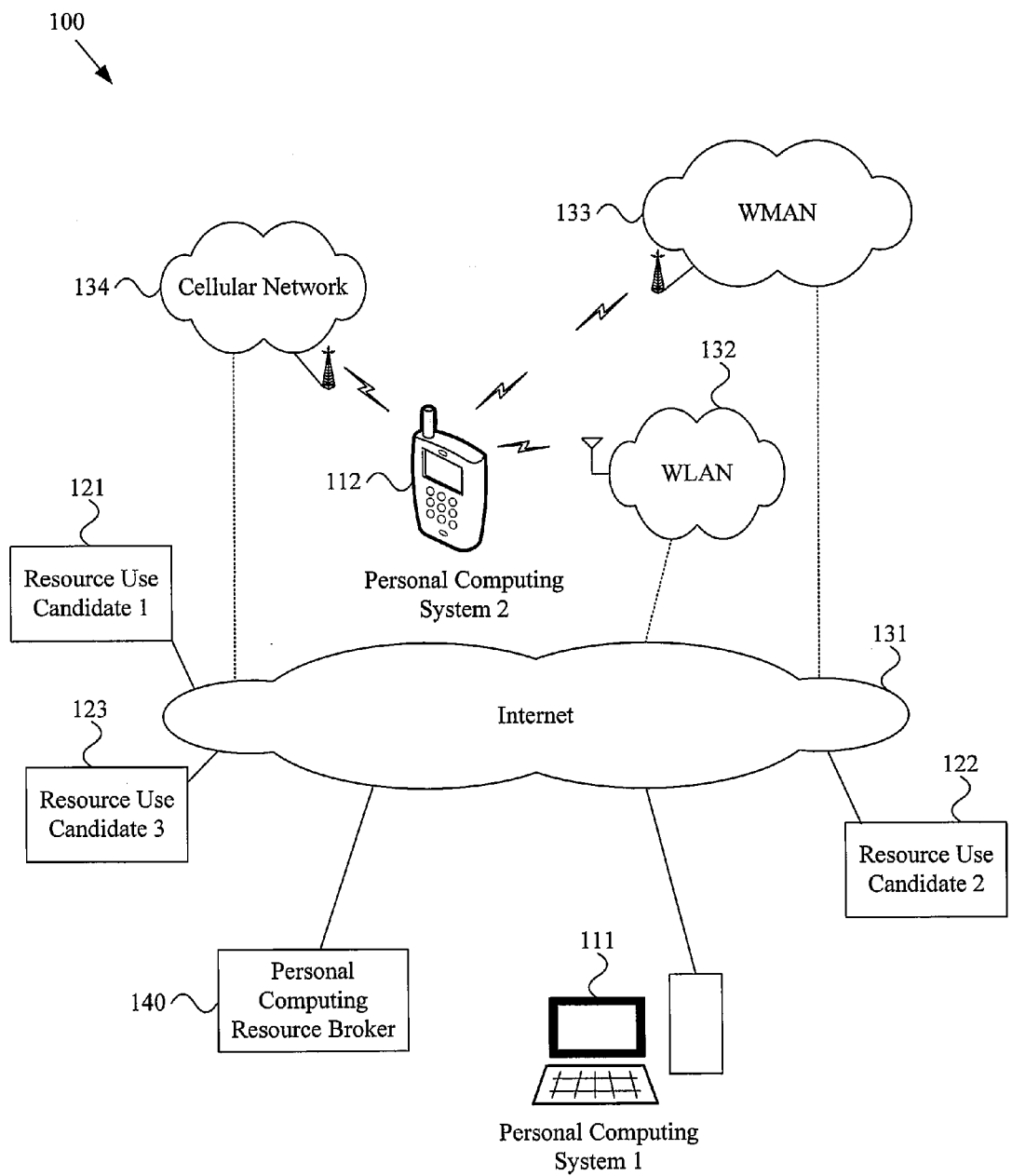
FIG. 1 is a diagram illustrating a non-limiting exemplary computing environment incorporating resource allocation and/or utilization in accordance with various aspects of the present invention.

In general, a personal computing system (e.g., a personal computing device) and communication bandwidth are often paid for whether utilized or not. Various other systems and/or services could make use of unutilized personal computing resources. Various aspects of the present invention provide a system and method for allocating unutilized personal computing resources to other systems for utilization. Such allocation and/or utilization may, for example, work to the mutual benefit of the supplier and user of such resources.

The following discussion will generally refer to a "personal computing system". A personal computing device (e.g., a personal computing system, or portion of, housed in a single unit) is an example of a personal computing system. A personal computing system may, for example and without limitation, be a personal computer (e.g., a desktop computer, laptop computer, notebook computer, pocket computer, etc.). A personal computing device/system may also, for example, comprise any of a variety of user devices having computing capability (e.g., a cellular telephone, personal digital assistant, portable email device, portable music player, personal video player, general personal media player, etc.).

Additionally, a personal computing device/system may, for example, be purchased by an employer and utilized in the workplace. For example, a computing device/system provided by an employer and utilized by an individual as a personal computing system may, for the sake of the following discussion, be considered a personal computing device/system. As a non-limiting example, a personal computer purchased by an employer or other institution may be considered a personal computing system and/or device for the following discussion. Similarly, a cellular telephone or portable email device purchased by an employer and used by an individual may be considered a personal computing system and/or device for the following discussion.

The following discussion may at times generally refer to "computing resource", "computing system resource" or "resource of a personal computing system". Such resources may, for example, comprise any of a large variety of hardware and/or software resources associated with a particular computing system. For example and without limitation, such resources may comprise processor resources (e.g., microprocessor or CPU cycles), for example on a dedicated or time-shared basis.

Such resources may, for example, comprise communication resources (e.g., network interface components and/or circuitry, wired or wireless transceiver components and/or circuitry, communication-related signal processing circuitry, etc.). Such resources may additionally, for example, comprise communication bandwidth. For example and without limitation, a personal computing system may be associated with a particular amount of communication bandwidth (e.g., as purchased by a user from a network access provider). At least a portion of such bandwidth may be managed as an allocable resource of the personal computing system.

Such resources may, for example, comprise memory resources (e.g., RAM space, ROM space, hard drive space, etc.). For example and without limitation, various portions of memory or memory devices of a personal computing system may be managed as allocable resources. Note that such memory resources may be housed internally at the personal computing system or may be external memory resources that are communicatively coupled to the personal computing system.

Such resources may, for example, comprise resources (e.g., hardware and/or software resources) associated with providing various types of services. For example and without limitation, such resources may comprise resources (e.g., processing resources, memory resources, communication resources, etc.) associated with providing a routing service (e.g., packet routing, message routing, data stream routing, etc.) for information destined for apparatus other than the personal computing system.

Such resources may also, for example, comprise resources (e.g., hardware and/or software resources) associated with providing a server service. As a non-limiting example, personal computing resources might be allocated to serve as a local hub or source of a popular movie, song, other media, gaming information, document, software file, etc. Such resources may further, for example, comprise resources (e.g., hardware and/or software resources) associated with providing a general computing service. Such resources may, for example and without limitation, comprise CPU cycles, memory space, communication circuitry and/or software, general communication bandwidth and/or signal processing circuitry associated with any of a variety of general computing operations.

Such resources may, for example, comprise resources (e.g., hardware and/or software) associated with performing various signal processing services or operations. For example and without limitation, such resources may comprise computing resources associated with performing data compression operations, decompression operations, encoding operations, decoding operations, encryption operation, decryption operation, etc. Such signal processing services may, for example, include video, graphical and/or audio signal processing services.

Such resources may, for example, comprise resources (e.g., hardware and/or software) associated with any of a variety of information management services. Such information management services may, for example, include data searching services, data sorting services, information storage services, database services, library services, etc.

Such resources may additionally, for example, comprise resources (e.g., hardware and/or software) associated with providing an access point service. For example, various resources of a personal computing system (e.g., wired/wireless communication resources, memory resources, processor resources, signal processing resources, power supply resources, etc.) may be utilized to operate as an access point for a communication network (e.g., the Internet, a LAN, PAN, WAN, MAN, cable television network, cellular telephone network, POTS network, satellite communication network, etc.). As a non-limiting example, various resources of a personal computing system might be utilized to provide wireless network access point services for a particular coverage area.

It should be recognized that the examples presented previously are non-limiting examples. Thus, the scope of various aspects of the present invention should not be limited by characteristics associated with any particular example, computing resource or set of resources presented previously unless explicitly claimed.

FIG. 1 is a diagram illustrating a non-limiting exemplary computing environment 100 incorporating resource allocation and/or utilization in accordance with various aspects of the present invention. The exemplary computing environment 100 includes a plurality of personal computing systems. Such personal computing systems may, for example, be generally operable as fixed systems at fixed locations or operable as mobile (or portable) systems. For example, the exemplary computing environment 100 includes a first personal computing system 111 (e.g., a laptop or desktop computer) and a second personal computing system 112 (e.g., a handheld personal computing system, such as, a personal digital assistant, handheld computer, portable email device, cellular telephone with computing capability, portable media player, etc.).

The exemplary computing environment 100 also includes a plurality of other computing systems that are candidates for utilizing resources of the personal computing systems 111, 112. For example, the exemplary computing environment 100 includes a first resource use candidate 121, a second resource use candidate 122 and a third resource use candidate 123. A resource use candidate may, for example, comprise any of a variety of computing systems associated with particular users, organizations, institutions, companies, etc. that might benefit from the utilization of resources of personal computing systems. Non-limiting examples of such resource use candidates include media providers (e.g., music providers, video providers, news providers, graphics providers, image providers, etc.), communication network access providers, educational institutions, research institutions, database providers, information search providers, communication providers, financial institutions, advertising companies, health care companies or institutions, insurance institutions, government organizations, etc.

The exemplary computing environment 100 includes a personal computing resource broker 140. Such a broker 140 may, for example, act as an intermediary between one or more personal computing systems and one or more resource use candidates. Such a broker 140 may, for example, comprise the capability to aggregate resources associated with a plurality of personal computing systems and negotiate on behalf of personal computing systems or resource use candidates to develop a mutually beneficial arrangement for resource utilization. Such a broker 140 may also, in various aspects, manage the utilization of personal computing system resources by resource use candidates. Generally, resource allocation/management functions performed by the personal computing resource broker 140 may alternatively be performed by personal computing systems and/or resource use candidates.

The exemplary computing environment 100 also includes a variety of exemplary communication networks that may communicatively couple the personal computing systems 111, 112, resource use candidates 121, 122, 123 and/or resource broker 140. For example, the exemplary computing environment 100 includes the Internet 131, a wireless local area network (WLAN) 132, wireless metropolitan area network (WMAN) 133 and cellular network 134. Each of such communication networks may be communicatively coupled with the others. The exemplary communication networks 131-134 may, for example, be utilized to communicate information associated with personal computing resources and associated incentives. The exemplary communication networks 131-134 may also, for example, be utilized to communicate information during utilization of various personal computing resources by one or more selected resource use candidates.

Figure 2:
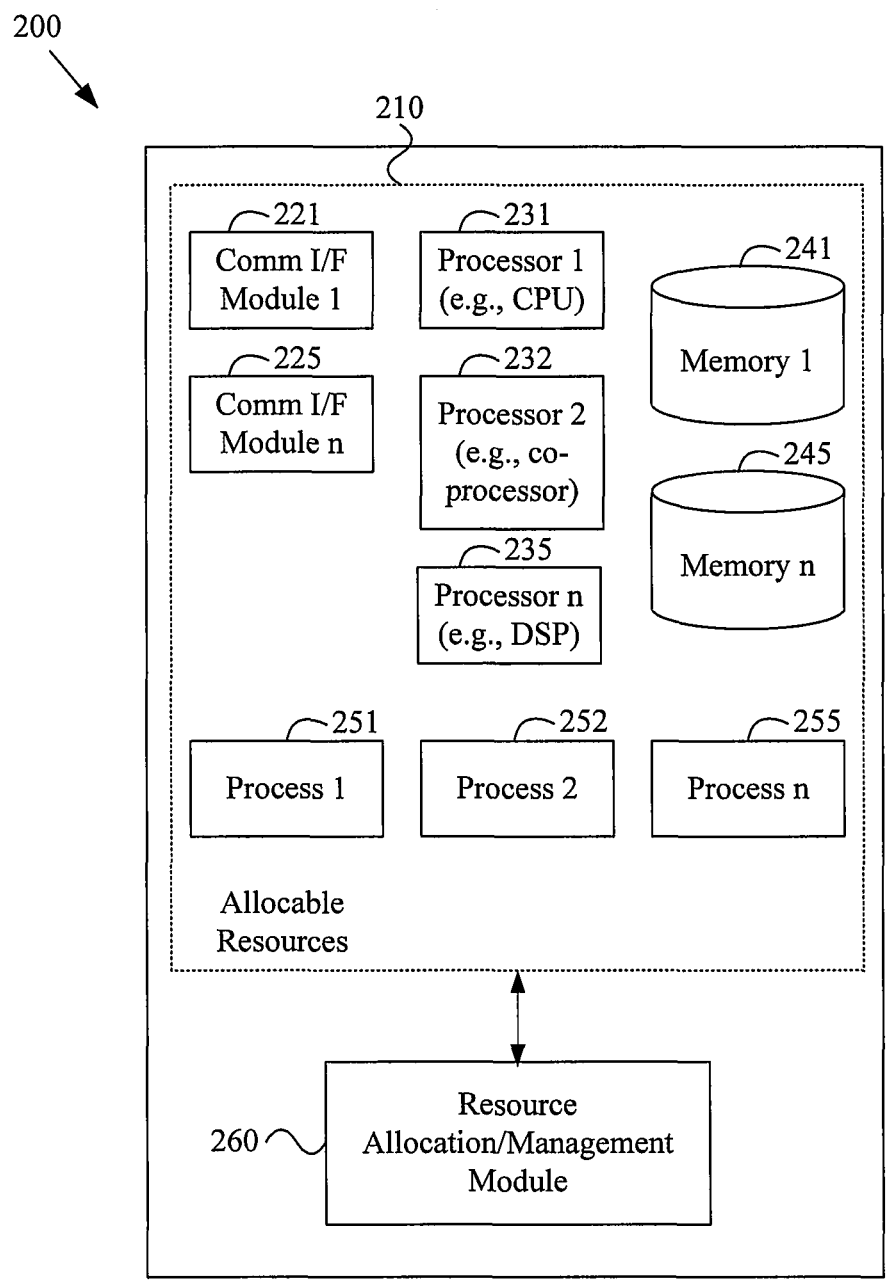
FIG. 2 is a block diagram illustrating a non-limiting exemplary personal computing system, in accordance with various aspects of the present invention.
Figure 3:
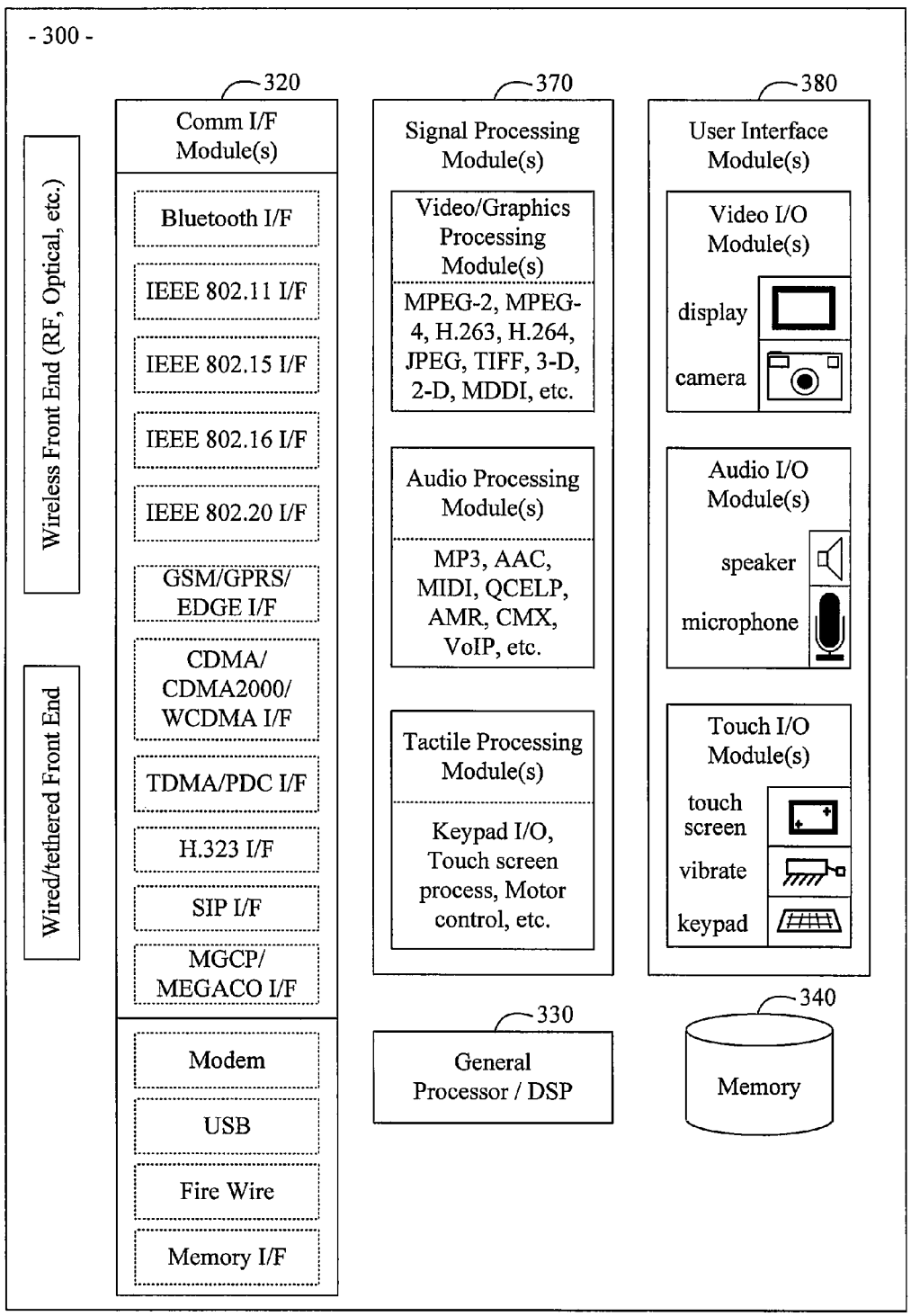
FIG. 3 is a block diagram illustrating a non-limiting exemplary personal computing system, in accordance with various aspects of the present invention.
Figure 4:
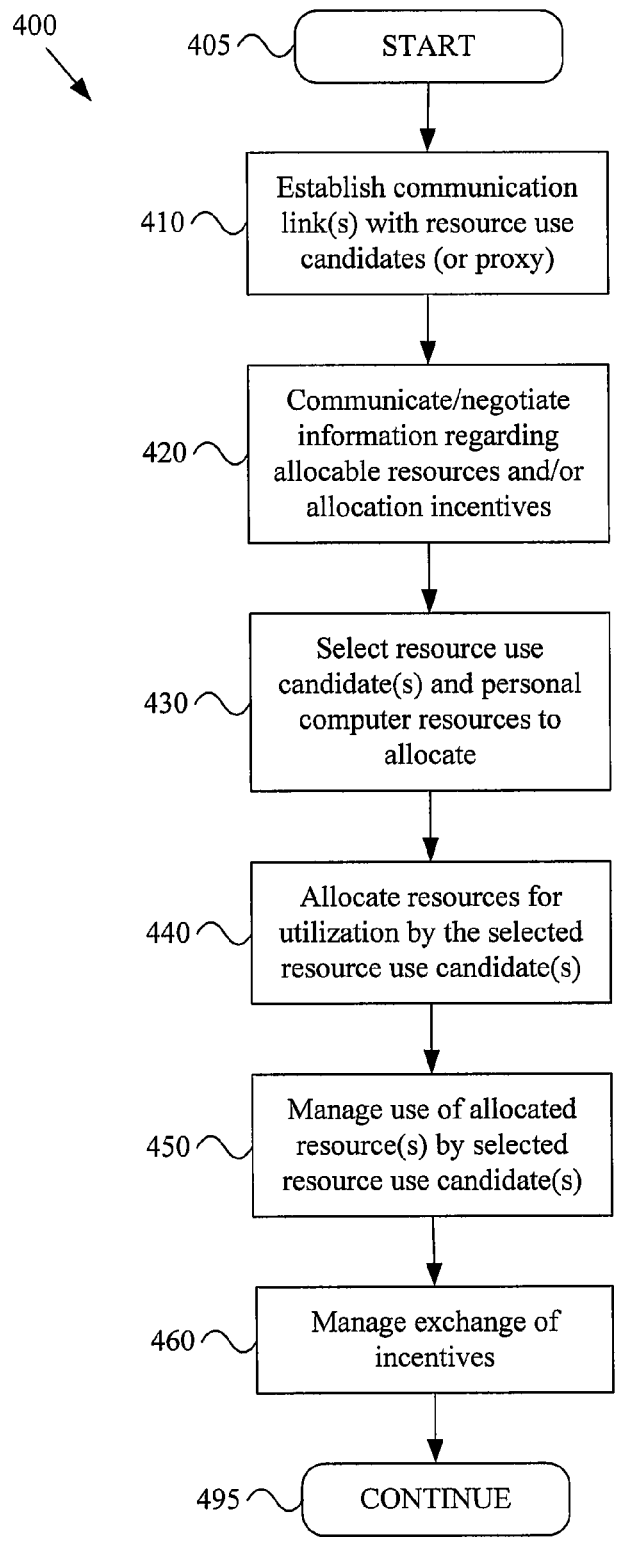
FIG. 4 is an exemplary flow diagram illustrating a method for allocating and/or utilizing computing resources, in accordance with various aspects of the present invention.

Various exemplary structural and/or functional characteristics of the entities shown in FIG. 1 will be presented in FIGS. 2-4.

FIG. 2 is a block diagram illustrating a non-limiting exemplary personal computing system 200, in accordance with various aspects of the present invention. The personal computing system 200 may, for example and without limitation, share any or all characteristics with the exemplary personal computing systems 111-112 illustrated in FIG. 1 and discussed previously. The personal computing system 200 may also, for example, share any or all characteristics with the personal computing system resource broker 140 illustrated in FIG. 1 and discussed previously.

The personal computing system 200 may, for example, comprise one or more allocable resources 210, where an allocable resource is generally a resource (e.g., hardware and/or software resource) of the personal computing system 200 that may be allocated for use by another computing system. The allocable resources 210 may, for example and without limitation, share any or all characteristics with the computing resources discussed previously.

The exemplary allocable resources 210 illustrated in FIG. 2 may, for example, comprise a first communication interface module 221 through an $n^{th}$ communication interface module 225. Such communication interface modules 221, 225 may be operable to perform communications between the personal computing system 200 and any of a large variety of other entities through any of a large variety of communication networks. Non-limiting examples of such communication interface modules 221, 225 are shown at block 320 of FIG. 3.

The allocable resources 210 may, for example, comprise a first processor 231, second processor 232 and $n^{th}$ processor 235. Such processors 231, 232, 235 may comprise characteristics of any of a variety of processing circuits. For example and without limitation, such processors 231, 232, 235 may comprise characteristics of any of a variety of microprocessors, microcontrollers, co-processors, digital signal processors, media processors, user I/O processors, signal processing circuits, application-specific processors, etc. Non-limiting examples of such processors 231, 232, 235 are shown at blocks 330 and 370 of FIG. 3.

The allocable resources 210 may also, for example, comprise a first memory 241 and $n^{th}$ memory 245. Such memory 241, 245 may comprise characteristics of any of a variety of memory types and/or devices. For example and without limitation, such memory 241, 245 may comprise characteristics of random access memory (RAM), read-only memory (ROM), volatile memory, non-volatile memory, hard drive memory, optical memory, magnetic memory, removable disk memory, on-board or off-board memory, flash memory, EPROM memory, EEPROM memory, local memory, non-local networked memory, etc.

The allocable resources 210 may additionally comprise resources or sets of resources associated with performing particular processes (e.g., a first process 251, second process 252 and $n^{th}$ process 253). As discussed previously, allocable personal computing resources may comprise resources or sets of resources associated with performing various services. The provision of such services may, for example, correspond with executing particular processes on the personal computing system 200. The execution of such processes may comprise utilizing any of a variety of hardware and/or software resources (e.g., processors, memory and/or other circuitry) of the personal computing system 200 associated with the execution of such processes.

The exemplary personal computing system 200 also comprises a resource allocation/management module 260 ("RAMM"). The RAMM 260 may, for example, be implemented in hardware and/or software. For example and without limitation, the RAMM 260 may be implemented by a processor executing software instructions (e.g., stored in memory of the personal computing system 200.

The RAMM 260 may, for example, perform any of a variety of operations associated with the allocation of personal computing system 200 resources for utilization by other computing systems and/or the management of such resource utilization. The RAMM 260 may share any or all characteristics with various resource allocation and/or resource management operations discussed previously. The RAMM 260 may also, for example, perform any or all functional aspects of the method 400 illustrated in FIG. 4 and discussed later.

FIG. 3 is a block diagram illustrating a non-limiting exemplary personal computing system 300, in accordance with various aspects of the present invention. The exemplary personal computing system 300 may, for example and without limitation, share any or all characteristics with the exemplary personal computing systems 111, 112 illustrated in FIG. 1 and the exemplary personal computing system 200 illustrated in FIG. 2.

The exemplary personal computing system 300 comprises a variety of non-limiting illustrative communication interface modules 320. Such modules 320 may, for example, operate to communicatively couple the personal computing system 300 to any of a variety of other computing and/or communicating entities through any of a variety of communication networks. For example and without limitation, the communication interface module 320 may comprise interface modules associated with a variety of communication protocols (e.g., Bluetooth, IEEE 802.11, IEEE 802.15, IEEE 802.16, IEEE 802.20, GSM/GPRS/EDGE, CDMA/CDMA 2000/WCDMA, TDMA/PDC, H.232, SIP, MGCP/MEGACO, etc.). The communication interface modules 320 may also comprise one or more modem interface modules, USB interface modules, FireWire interface modules and/or various memory interface modules. The personal computing system 300 may also comprise any of a variety of front-end communication circuits associated with communicating over a particular communication medium (e.g., wired, wireless, tethered optical, non-tethered optical media, etc.).

The exemplary personal computing system 300 also comprises general processing and/or digital signal processing circuitry 330 and a memory 340. Such processing circuitry 330 and/or memory 340 may share any or all characteristics with the processing circuitry and/or memory discussed previously with regard to FIGS. 1-2.

The exemplary personal computing system 300 also comprises a variety of user interface modules 380. As will be discussed later with regard to the method 400 illustrated in FIG. 4, various aspects of the present invention may include user interface aspects. Such user interface aspects may, for example, be performed utilizing any of the exemplary user interface modules 380 or other types of user interface devices, hardware and/or software not illustrated. The exemplary user interface module 380 may, for example, comprise video I/O modules (e.g., display output modules, camera input modules, etc.), audio I/O modules (e.g., speaker output modules, microphone input modules, etc.), touch (or tactile) I/O modules (e.g., touch screen input modules, vibratory output modules, keypad input modules, trackball input modules, mouse input modules, touch pad input modules, etc.).

FIG. 4 is an exemplary flow diagram illustrating a method 400 for allocating and/or utilizing computing resources, in accordance with various aspects of the present invention. Various aspects of the exemplary method 400 may, for example and without limitation, be performed by personal computing systems 111, 112 illustrated in FIG. 1 (or circuitry thereof), the personal computing system 200 illustrated in FIG. 2 (or circuitry thereof) and/or the personal computing system 300 illustrated in FIG. 3 (or circuitry thereof). Various aspects of the exemplary method 400 may alternatively, for example and without limitation, be performed by the personal computing resource broker 140 (or circuitry thereof) and/or the resource use candidates 121, 122, 123 illustrated in FIG. 1 (or circuitry thereof).

The exemplary method 400 begins executing at step 405. The exemplary method 400 may begin executing in response to any of a variety of causes or conditions. For example and without limitation, the exemplary method 400 may begin executing in response to a user command to begin or in response to an operating profile of a personal computing system. Also for example, the exemplary method 400 may begin executing in response to receiving a request for utilization of one or more personal computing system resources. The exemplary method 400 may also, for example, begin executing based on a predetermined schedule of operation. The scope of various aspects of the present invention should not be limited by characteristics associated with any particular cause or condition.

The exemplary method 400 may, at step 410, comprise establishing one or more communication links. During the process of determining allocation of computing system resources, allocating the computing system resources, utilizing the computing system resources, managing the utilization of the computing system resources and/or managing the exchange of incentives, any of a variety of entities may be involved. Communication links between the involved entities may be formed at step 410 and/or on an as-needed basis.

For example, in a non-limiting exemplary scenario where a personal computing system is communicating with another system (e.g., a resource use candidate) regarding the utilization of one or more resources of the personal computing system by the other system, step 410 may comprise establishing one or more communication links for such communication. In another non-limiting exemplary scenario where a personal computing system is communicating with an intermediary system (e.g., a personal computing system resource broker) regarding the utilization of one or more resources of the personal computing system by another system (e.g., a resource use candidate), step 410 may comprise establishing one or more communication links for such communication system. In yet another non-limiting exemplary scenario where an intermediary system (e.g., a personal computing system resource broker) is communicating with another system (e.g., a resource use candidate) regarding the utilization of one or more resources of the personal computing system by the other system, step 410 may comprise establishing one or more communication links for such communication.

There may also, in various scenarios, be communication between a plurality of personal computing systems, a plurality of other computing systems (e.g., resource use candidates) and/or a plurality of intermediate systems (e.g., personal computing system resource brokers). In general, step 410 may comprise establishing the communication links utilized for at least the personal computing system resource allocation determination and/or allocation, but may also include establishing communication links used for the utilization of allocated personal computing system resources by the computing system to which such resources have been allocated.

Step 410 may comprise utilizing any of a variety of communication interface hardware and/or software to establish such communication links. For example and without limitation, step 410 may comprise utilizing any of the variety of communication modules discussed previously with regard to the exemplary systems illustrated in FIGS. 1-3.

The exemplary method 400 may, at step 420, comprise communicating information regarding available personal computing system resources with other computing systems (e.g., resource use candidates or proxies thereof, resource brokers, resource managers, etc.). Many examples of such personal computing system resources were discussed previously.

Such communication may, for example, comprise communicating information regarding which personal computing system resources are available for utilization by other computing systems and/or which personal computing system resources are desired for utilization by other computing systems. Such information may, for example, be compared to determine whether an available personal computing system resource is desired by another computing system.

The exemplary method 400 may also, at step 420, comprise communicating information regarding incentives associated with the utilization of one or more personal computing system resources by one or more other computing systems (e.g., communicating with resource use candidates or proxies thereof, resource brokers, resource managers, etc.). For example and without limitation, an incentive may be offered by another computing system (e.g., a resource use candidate or a proxy thereof) to the personal computing system (or a user or owner thereof) for the utilization of one or more personal computing system resources by the other computing system. As an example, a first other computing system may offer a first incentive to a user of the personal computing system for the utilization of access point resources, and a second other computing system may offer a second incentive to the user of the personal computing system for the utilization of the same access point resources or different resources.

The incentives associated with the utilization of a personal computing system by one or more other computing systems may comprise any of a variety of characteristics. For example and without limitation, such incentives may comprise an offer of consumer goods and/or services to the user and/or owner of the personal computing system. For example, such incentives may comprise characteristics of monetary amounts/credits (e.g., credit on a bill or account), access to a particular service (e.g., a media providing service), access to a service at a particular quality level (e.g., premier service level, Gold Club member, etc.), tax credits (e.g., with regard to allocating resources to charitable organizations, the government, educational institutions, etc.), or basically anything of value (e.g., frequency flyer miles, coupons, club membership, sales specials, free media, including movies or music, etc.).

Step 420 may, for example, comprise communicating various information regarding auctioning the utilization of personal computing system resources. For example and without utilization, step 420 may comprise soliciting bids from other computing systems for the utilization of various personal computing system resources by other computing systems. Also for example, step 420 may comprise soliciting and/or asking for higher bids from computing systems for the utilization of various personal computing system resources. Such information may, for example, be utilized to allocate resources of a personal computing system to a highest bidder, group of highest bidders or group of bidders that maximize value associated with an aggregate set of incentives.

Step 420 may, for example, comprise communicating negotiating information regarding the utilization of personal computing system resources by another computing system and related incentives provided for such use. For example, step 420 may comprise communicating offer, counter-offer and acceptance information related to the utilization of personal computing system resources by another computing system.

Step 420 may also, for example, comprise communicating constraint information regarding the utilization of one or more resources of the personal computing system. For example and without limitation, step 420 may comprise communicating information related to amount of use limits, duration of use limits, time-of-day use limits, security abilities and/or limitations, systems capabilities required for use of one or more resources, etc.

Step 420 may be performed by various computing systems and/or components thereof. For example and without limitation, step 420 or portions thereof may be performed by a personal computing system or a computing system external to the personal computing system (e.g., a proxy of the personal computing system, a third party personal computing system broker, etc.). As a non-limiting example, a personal computing system (or circuitry thereof) may operate to provide information of available allocable resources and receive information of respective incentives associated with the utilization of such resources by one or more other computing systems.

In general, step 420 may comprise communicating information regarding available personal computing system resources with other computing systems (e.g., availability, capability, incentives, etc.). The scope of various aspects of the present invention should not be limited by characteristics of particular information that may be communicated, in particular the non-limiting exemplary information presented previously, unless explicitly claimed.

The exemplary method 400 may, at step 430, comprise selecting, based at least in part on associated incentives (e.g., as communicated at step 420), whether one or more resources of the personal computing system shall be allocated for utilization by another computing system and/or to which computing system the one or more resources of the personal computing system shall be allocated for utilization.

In various scenarios, step 430 may comprise determining whether various resources of the personal computing system shall be allocated to any other computing system. For example and without limitation, if negotiations regarding a particular resource fail, the end result may be that no allocation of such resource occurs. Also for example, in a competitive scenario involving a plurality of computing systems competing for utilization of a personal computing system resource, if a particular minimum incentive is not offered, the end result may be that no allocation of such resource to any of the competing system occurs.

Step 430 may comprise selecting a computing system to which a personal computing system resource shall be allocated in any of a variety of manners. For example and without limitation, step 430 may comprise selecting a computing system that offers the most valuable incentive for the utilization of the personal computing system resource. Also, for example, step 430 may comprise selecting the first computing system that offers an incentive that meets a particular value threshold. Further for example, step 430 may comprise offering to allocate a personal computing system resource in exchange for a particular incentive and allocating the personal computing system resource to the first computing system that responds positively to the offer.

Step 430 may, for example, comprise comparing offered incentives to a list or table of desired incentives. Such a table may, for example, comprise a cross-list between personal computing system resources and desired incentives. Such a table may, for example, comprise information describing various conditions under which various incentives are desired. For example and without limitation, desired incentives may change as a function of time of day, day, date, current resource/system utilization, available power/energy supply, etc. In addition, various resource use candidates may, for example, be indicated as preferred, non-preferred or black-listed. Step 430 may then, for example, comprise selecting a computing system to which to allocate personal computing system resources based, at least in part, on the comparison between the offered incentives and the list or table of incentives. As will be discussed later, such a list or table may be formed through interacting with a user of the personal computing system.

Step 430 may, for example, comprise characteristics associated with auctioning (e.g., forward or reverse auctioning) allocation/utilization of the personal computing system resource to the highest bidder as determined by value associated with various offered incentives or to the first bidder that provides a particular level of incentive.

Step 430 may also, for example, comprise characteristics associated with negotiating regarding allocation/utilization of one or more personal computing system resources. For example and without limitation, step 430 may comprise making offers, counteroffers, acceptances and/or refusals in an effort to obtain the most valuable incentives for the owner and/or user of the personal communication system for the utilization of the personal computing system resource(s). As a non-limiting example, step 430 may comprise asking a resource use candidate to increase a level of incentive offered for utilization of one or more personal computing system resources. Step 430 may, for example, comprise negotiating with a plurality of other computing systems regarding utilization of the personal computing system resource(s), ultimately selecting the computing system that provides the most satisfactory deal to the owner and/or user of the personal computing system based on predetermined selection criteria. Step 430 may further, for example, comprise communicating information of a minimum acceptable incentive associated with the utilization of a personal computing system resource by another computing system and allocating such resource for utilization by the other computing system when an incentive is offered that meets a minimum acceptable level.

As mentioned previously, step 430 may comprise selecting whether and/or where to allocate personal computing system resources based, at least in part, on selection criteria. Such selection criteria may, for example, be user-defined. For example, the personal computing system, or a proxy thereof, may interface with a user of the personal computing system to determine such selection criteria. As a non-limiting example, step 430 may comprise interacting with a user of the personal computing system utilizing any or all of the user interface modules 380 illustrated in FIG. 3 and discussed previously.

Additionally, various aspects of the exemplary method 400 may comprise interacting with a user of the personal computing system during the allocation determination process. For example, step 430 may comprise presenting allocation options to a user for selection by the user. Also for example, step 430 may comprise presenting a determined allocation to a user for verification and/or acceptance by a user. In various exemplary scenarios, step 430 may comprise determining whether to interact with the user based on various criteria (e.g., the particular resource being allocated, particular types of incentives, particular resource use candidates, time and/or day, whether the user is currently utilizing the personal computing system, etc.).

Step 430 may comprise selecting a computing system to which to allocate personal computing resources based, at least in part, on non-incentive based selection criteria. For example and without limitation, such selection criteria may specify particular other computing systems (or, for example, types thereof) that are preferred resource use candidates. As a non-limiting example, an owner and/or user of a personal computing system may specify that educational institutions or disease research centers have priority over the utilization of various resources of the personal computing system. Also for example, an owner and/or user may specify that various types of organizations shall never have access to resources of the personal computing system. Such non-incentive based criteria may also, for example, comprise criteria based on the nature of the use of the personal computing resources and/or the geographical location of the other computing system.

Such non-incentive based criteria may also comprise time, day and/or date information associated with periods of time during which various resources of the personal computing system shall not be allocated for utilization by another computing system. Such non-incentive based criteria may also comprise information regarding particular other trusted computing systems or, for example, other computing systems corresponding to previous successful resource allocations.

Such non-incentive based criteria may additionally, for example, comprise information of default resource allocations. As a non-limiting example, a default resource allocation (e.g., to a particular other computing system or type of other computing system) may result unless an incentive of at least a particular value is offered. In general, step 430 may comprise selecting the computing system based on any of a large variety of non-incentive based selection criteria.

Step 430 may comprise allocating one or more personal computing system resources for utilization by more than one other computing system. Such allocation may, for example, concern different resources or identical resources. In a non-limiting exemplary scenario, step 430 may comprise allocating various personal computing system resources to perform a network access point service for a first other computing system, and allocating various personal computing system resources to perform a media distribution service for a second other computing system. Step 430 may also, for example, comprise allocating a same resource for utilization by a plurality of other computing systems (e.g., on a parallel, time-shared or otherwise shared basis).

Step 430 may, for example, comprise forming an agreement, contract or some other form of commitment to provide a particular type and amount of personal computing system resources in exchange for particular incentives. Such agreements may, for example, be electronically signed and/or verified for authenticity. In a non-limiting exemplary scenario, such an agreement may state that in exchange for a particular incentive, a particular personal computing system resource shall be allocated for utilization by a particular other system for a particular time period. In such an exemplary scenario, upon performance of the agreement (or, for example, at periods of partial performance), incentives or portions thereof may be transferred to the owner/user of the personal computing system.

Step 430 may be performed by various computing systems and/or components thereof. For example and without limitation, step 430 or portions thereof may be performed by a personal computing system or a computing system external to the personal computing system (e.g., a proxy of the personal computing system, a third party personal computing system broker, etc.). As a non-limiting example, a personal computing system may operate to determine whether to allocate one or more allocable resources of the personal computing system to one or more other computing systems.

In general, step 430 may comprise selecting, based at least in part on associated incentives (e.g., as communicated at step 420), whether one or more resources of the personal computing system shall be allocated for utilization by another computing system and/or to which computing system the one or more resources of the personal computing system shall be allocated for utilization. The scope of various aspects of the present invention should not be limited by characteristics of the previously discussed exemplary illustrations unless explicitly claimed.

The exemplary method 400 may, at step 440, comprise allocating the personal computing system resource(s) to the other computing system(s) selected at step 430. Step 440 may comprise performing such allocation in any of a variety of manners. For example and without limitation, such allocation may comprise communicating information of the allocation to other computing systems (e.g., the computing system(s) selected to receive the allocation). Such communication may, for example, comprise outputting one or more signals indicating the allocation of the personal computing system resource for utilization by the selected computing system. Such signals may, for example and without limitation, be generated by any of the hardware and/or software discussed previously with regard to the personal computing systems illustrated in FIGS. 1-3. Such signals may, for example, comprise signals internal to the personal computing system, a personal computing system broker and/or resource use candidate. Such signals may also, for example, comprise signals communicated between such systems.

Also for example, such allocation may comprise tracking respective allocations associated with respective personal computing system devices. Such tracking may, for example, comprise identifying resources as allocated or non-allocated. In a non-limiting exemplary scenario, step 440 may comprise maintaining a table identifying various personal computing system resources and their respective allocation status.

Step 440 may be performed by various computing systems and/or components thereof. For example and without limitation, step 440 or portions thereof may be performed by a personal computing system or a computing system external to the personal computing system (e.g., a proxy of the personal computing system, a third party personal computing system resource broker, etc.). As a non-limiting example, a personal computing system may operate to allocate a resource of the personal computing system for utilization by the computing system selected at step 430.

In general, step 440 may comprise allocating the personal computing system resource(s) to the other computing system(s) selected at step 430. The scope of various aspects of the present invention should not be limited by characteristics of the previously discussed exemplary illustrations unless explicitly claimed.

The exemplary method 400 may, at step 450, comprise managing utilization of the allocated resource(s) (e.g., as allocated at step 440) by the selected computing system(s) (e.g., as selected at step 430). Step 450 may comprise managing utilization of the allocated resource(s) in any of a variety of manners.

For example, step 450 may comprise establishing one or more communication links between the personal computing system and the selected computing system through which the selected computing system may utilize the allocated personal computing system resource. Such communication links may, for example, be utilized to communicate command, control and/or data information between the selected computing system and the allocated personal computing system resource.

Also for example, step 450 may comprise the personal computing system and the selected computing system interacting during utilization of the personal computing resource by the selected computing system. Such interaction may, for example, comprise utilizing a handshaking protocol known to both the personal computing system and the selected computing system. Such interaction may, for example, comprise utilizing an application program interface or, for example, a library of interface routines residing on the personal computing system and/or the selected computing system.

Step 450 may comprise establishing a secure communication and/or secure resource utilization environment. For example, step 450 may comprise establishing information communication security (e.g., encryption key exchange) on communication links between the personal computing system and the selected computing system. Also for example, step 450 may comprise establishing information security within the personal computing system. As a non-limiting example, step 450 may comprise establishing firewall or other secure access mechanisms to restrict access to the allocated resource(s) during the utilization of such allocated resource(s) by the selected computing system. Such restricted access may, for example, apply to the personal communication system as well as to other computing systems to which resources may have been allocated, enabling the selected computing system to utilize the personal computing system resource allocated to the selected computing system in a secure manner. Such restricted access may, for example, apply to memory space, data streams, signal processing space/buffers, etc.

Step 450 may, for example, comprise establishing remote direct memory access (RDMA) between allocated memory of the personal computing system and the selected computing system. Step 450 may also, for example, comprise establishing information routing tables associated with the transfer of information between the selected computing system and the allocated personal computing system resource.

Step 450 may, for example, comprise monitoring utilization of the allocated personal computing system resource(s) by the selected computing system(s). Step 450 may thus, for example, ensure that the selected computing system is not accessing and/or utilizing personal computing system resources other than those resources allocated for utilization by the selected computing system.

When utilization of the allocated personal computing system resource is complete, step 450 may comprise managing a teardown of the resource sharing environment. For example and without limitation, step 450 may comprise tearing down communication links that were established between the selected computing system and the personal computing system resource. Step 450 may also, for example, comprise returning the shared personal computing system resource to a particular state (e.g., the state in which such resource was in just prior to allocation to and utilization by the selected computing system). As a non-limiting example, step 450 may comprise flushing shared memory and/or buffer space of the personal computing system utilized by the selected computing system. Step 450 may, for example, comprise managing teardown of the resource sharing environment autonomously or by working in conjunction with other system entities (e.g., personal computing resource brokers and/or the selected computing system).

Step 450 may be performed by various computing systems and/or components thereof. For example and without limitation, step 450 or portions thereof may be performed by a personal computing system or a computing system external to the personal computing system (e.g., a proxy of the personal computing system, a third party personal computing system resource broker, etc.). In a non-limiting exemplary scenario, a personal computing system resource broker may operate to manage the utilization of the allocated personal computing system by the selected computing system. In such an exemplary scenario, such a resource broker might, for example, operate to manage access to allocated resources (e.g., by directing parallel processing operations, managing data flow to/from allocated resources, providing firewall/secure access functionality, etc.).

In general, step 450 may comprise managing utilization of the allocated resource(s) (e.g., as allocated at step 440) by the selected computing system(s) (e.g., as selected at step 430). The scope of various aspects of the present invention should not be limited by characteristics of the previously discussed exemplary illustrations unless explicitly claimed.

The exemplary method 400 may, at step 460, comprise managing the exchange (or transfer) of incentives associated with utilization of a personal computing system resource by another computing system. Step 460 may comprise any of a variety of characteristics. For example and without limitation, step 460 may comprise communicating incentive transfer information between the selected computing system and the personal computing system (or owner/user thereof). Such incentive transfer information may, for example, comprise address information, account information, funds routing information, shipping information, coupon identification information, incentive identification information, etc.

Step 460 may then, for example, comprise transferring the incentive utilizing the incentive transfer information. The details of such transfer depend on the nature of the particular incentive. Step 460 may also, for example, comprise verifying that transfer of the incentive has been completed. In an exemplary scenario, step 460 may comprise notifying the owner and/or user of the personal computing system of the incentive transfer.

In general, step 460 comprises managing the exchange (or transfer) of incentives associated with utilization of a personal computing system resource by another computing system. The scope of various aspects of the present invention should not be limited by characteristics of any particular manner of managing such exchange unless explicitly claimed.

The exemplary method 400 may, at step 495, comprise performing continued processing. Such continued processing might, for example and without limitation, comprise looping execution back to step 410 to continue allocating personal computing system resources for utilization by other computing systems. Such continued processing may, for example, comprise performing various user interface activities (e.g., regarding selection criteria). Such continued processing may also, for example, comprise performing normal computing activities with the personal computing system absent the allocation of personal computing system resources for utilization by another computing system. In general, step 495 may comprise performing any of a large variety of continued processing activities.

Various aspects of the present invention will now be presented by way of non-limiting exemplary scenarios.

In a first non-limiting exemplary scenario, a personal computing system (or proxy thereof) establishes communication with an on-demand media provider (or proxy thereof). As explained previously, such communication may occur through various intermediaries.

The personal computing system negotiates with the media provider (or a plurality of media providers) regarding utilization of server resources. For example, the personal computing system might offer to function as a neighborhood server in exchange for receiving a particular number of popular movies from the media provider for a particular month. In the exemplary scenario, a first media provider is offering an incentive of a free movie for the particular month in which the personal computing system serves as a local server (or router) for at least a particular amount of time. A second media provider is offering an incentive of a free movie and a billing credit.

Based, at least in part, on the offered incentives, the personal computing system determines (e.g., based on user-defined selection criteria) that the personal computing system will allocate the necessary computing resources to the second media provider. The personal computing system, or a circuit thereof, may generate one or more signals indicative of the decision.

The personal computing system then works with the selected second media provider to provide access to the allocated resources and manage utilization of the allocated resources by the second media provider.

In a second non-limiting exemplary scenario, a personal computing system (or proxy thereof) negotiates with a communication network access provider to determine incentives available from the network access provider in exchange for allocation of computing resources for utilization as an access point to the communication network.

The personal computing system determines that the credit being offered by the network access provider is too small, and asks the network access provider to offer a greater incentive. If (e.g., based on supply/demand) the network access provider determines to offer a greater incentive, the personal computing system might determine to allocate the computing resources for such use. On the other hand, if the network access provider fails to offer a great enough incentive, the personal computing system might determine to break off negotiations, for example to seek out other potential resource use candidates.

In a third non-limiting exemplary scenario, a personal computing system (or proxy thereof) negotiates with a non-profit research institute (or proxy thereof) for providing access to 1 GHz of processor speed of the personal computing system (e.g., a portion of the personal computing system's processing power) for overnight utilization by the research institute. In this exemplary scenario, the non-profit research institute has no incentives to offer.

The personal computing system determines (e.g., based on user defined selection criteria) that, absent a particular level of incentive from another resource use candidate, the personal computing system will allocate a particular amount and type of computing resource to non-profit institutions. In the exemplary scenario, the personal computing system does not receive such level of incentive from another resource use candidate, so the personal computing system determines to allocate the particular amount and type of computing resource to the non-profit research institute. The personal computing system then performs such resource allocation, resource utilization management, etc.

The previous non-limiting examples were generally discussed from the perspective of the personal computing system (or a proxy thereof). Various aspects of the present invention also apply to operation of resource use candidates (or proxies thereof). As non-limiting examples, a resource use candidate (or a proxy thereof) may operate to communicate with and/or negotiate with a personal computing system (or a proxy thereof) to acquire the allocation of personal computing resources for utilization by the resource use candidate. The resource use candidate may, for example, determine incentives to offer personal computing systems (or owners/users thereof) and communicate such incentives to one or more personal computing systems (or proxies thereof). The activities of such a resource use candidate may be readily ascertained by consideration of the previously mentioned structure and/or functionality from the perspective of a resource use candidate.

In summary, various aspects of the present invention provide a system and method for allocating and/or utilizing spare computing system (e.g., personal computing system) resources.

While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims

What is claimed is:

1. A method of allocating a resource of a personal computing system for utilization by another computing system, comprising:
    receiving information of respective incentives and usage constraints associated with the utilization of the resource of the personal computing system by each of a plurality of computing systems, the personal computing system being associated with a particular user, the usage constraints including at least amount of use limits, duration of use limits, time of day use limits, system requirements and security requirements;
    selecting, based on the respective incentives and on whether the respective incentives exceed a predetermined minimum threshold, a computing system of the plurality of computing systems to which the resource of the personal computing system shall be allocated, the resource of the personal computing system not being allocated to any of the plurality of computing systems when the respective incentives do not exceed the predetermined minimum threshold, at least a subset of the plurality of computing system being barred from resource allocation irrespective of incentives and usage constraints;
    wherein when the respective incentives exceed the predetermined minimum threshold and non-incentive based criteria are satisfied, the method further includes:
    allocating the resource of the personal computing system for utilization by the selected computing system;
    outputting a signal indicating the allocation of the resource of the personal computing system for utilization by the selected computing system, a secure resource utilization environment being established through which the selected computing system utilizes the allocated resource; and
    after completion of utilization of the allocated resource by the selected computing system, tearing down the secure resource utilization environment and restoring the personal computing system to a state shared by the personal computing system prior to utilization of the allocated resource by the selected computing system,
    wherein the non-incentives based criteria include membership of a group or geographical location of the plurality of computing systems.

2. The method of claim 1, wherein the information of respective incentives comprises information of a respective consumer good offered in exchange for utilization of the resource of the personal computing system by another computing system.

3. The method of claim 1, wherein the information of respective incentives comprises information of a respective consumer service offered in exchange for utilization of a resource of the personal computing system by another computing system.

4. The method of claim 1, wherein the resource of the personal computing system comprises a wireless communication resource.

5. The method of claim 1, wherein the resource of the personal computing system comprises a microprocessor.

6. The method of claim 1, wherein the resource of the personal computing system comprises signal processing circuitry.

7. The method of claim 1, wherein the resource of the personal computing system comprises computer memory.

8. The method of claim 1, wherein the resource of the personal computing system comprises resources associated with utilizing the personal computing system as a router.

9. The method of claim 1, wherein the resource of the personal computing system comprises resources associated with utilizing the personal computing system as a server.

10. The method of claim 1, wherein the resource of the personal computing system comprises resources associated with utilizing the personal computing system as a communication network access point.

11. The method of claim 1, further comprising managing utilization of the allocated resource by the selected computing system.

12. The method of claim 1, further comprising establishing one or more communication links between the personal computing system and the selected computing system through which the selected computing system utilizes the allocated resource.

13. The method of claim 1, further comprising managing transfer of a respective incentive associated with the utilization of the resource of the personal computing system by the selected computing system.

14. The method of claim 1, further comprising interacting with the particular user of the personal computing system to establish selection criteria utilized during the selecting step.

15. The method of claim 1, further comprising soliciting information regarding respective incentives associated with the utilization of the resource of the personal computing system from a plurality of other computing systems.

16. The method of claim 1, further comprising auctioning the resource of the personal computing system for utilization by another computing system.

17. A method of allocating a resource of a personal computing system for utilization by another computing system, the method comprising:
  negotiating regarding the allocation of the resource of the personal computing system for utilization by at least one of a plurality of computing systems, the personal computing system being associated with a particular user, the negotiation including receipt of usage constraints for the resource including at least amount of use limits, duration of use limits, time of day use limits, system requirements and security requirements;
  determining, based at least in part on the negotiating and on non-incentives based criteria, whether to allocate the resource of the personal computing system for utilization by at least one of the plurality of computing systems, the resource of the personal computing system being allocated when incentives offered during the negotiating exceed a predetermined minimum, the resource of the personal computing system not being allocated to the plurality of computing systems when the incentives do not exceed the predetermined minimum, at least a subset of the plurality of computing systems being barred from resource allocation irrespective of incentives and usage constraints; and
  when the resource of the personal computing system is to be allocated for utilization by at least one of the plurality of computing systems, then:
  allocating the resource of the personal computing system for utilization by the at least one of the plurality of computing systems;
  outputting a signal indicating the allocation of the resource of the personal computing system for utilization by the at least one of the plurality of computing systems, a secure resource utilization environment being established through which the at least one of the plurality of computing systems utilizes the allocated resource; and
  after completion of utilization of the allocated resource by the at least one of the plurality of computing systems, tearing down the secure resource utilization environment and restoring the personal computing system to a state shared by the personal computing system prior to utilization of the allocated resource by the at least one of the plurality of computing systems,
  wherein the non-incentives based criteria include membership of a group or geographical location of the plurality of computing systems.

18. The method of claim 17, wherein negotiating regarding the allocation of the resource of the personal computing system for utilization by the at least one of the plurality of computing systems comprises negotiating regarding the incentives offered.

19. The method of claim 18, wherein the incentives comprises information of a consumer good offered in exchange for utilization of the resource of the personal computing system by the at least one of the plurality of computing systems.

20. The method of claim 18, wherein the incentives comprises information of a consumer service offered in exchange for utilization of the resource of the personal computing system by the at least one of the plurality of computing systems.

21. The method of claim 17, wherein the resource of the personal computing system comprises a wireless communication resource.

22. The method of claim 17, wherein the resource of the personal computing system comprises a microprocessor.

23. The method of claim 17, wherein the resource of the personal computing system comprises signal processing circuitry.

24. The method of claim 17, wherein the resource of the personal computing system comprises computer memory.

25. The method of claim 17, wherein the resource of the personal computing system comprises resources associated with utilizing the personal computing system as a router.

26. The method of claim 17, wherein the resource of the personal computing system comprises resources associated with utilizing the personal computing system as a server.

27. The method of claim 17, wherein the resource of the personal computing system comprises resources associated with utilizing the personal computing system as a communication network access point.

28. The method of claim 17, further comprising, if it is determined to allocate the resource of the personal computing system for utilization by the at least one of the plurality of computing systems, then establishing one or more communication links between the personal computing system and the at least one of the plurality of computing systems through which the at least one of the plurality of computing systems may utilize the allocated resource.

29. The method of claim 17, further comprising managing transfer of a respective incentive associated with the utilization of the resource of the personal computing system by the at least one of the plurality of computing systems.

30. The method of claim 17, further comprising interacting with the particular user of the personal computing system to establish determination criteria utilized during the determining step.

31. The method of claim 17, further comprising negotiating regarding the allocation of the resource of the personal computing system for utilization by at least another one of the plurality of computing systems, and wherein determining whether to allocate the resource of the personal computing system for utilization by the at least one of the plurality of computing systems comprises making said determination based, at least in part, on the negotiating regarding the allocation of the resource of the personal computing system for utilization by the at least another one of the plurality of computing systems.

* * * * *